United States Patent
Wu

(10) Patent No.: US 8,791,907 B2
(45) Date of Patent: Jul. 29, 2014

(54) TOUCH SENSING APPARATUS AND METHOD USING DIFFERENT MODULATED DRIVING SIGNALS

(75) Inventor: Hung Wei Wu, Zhonghe (TW)

(73) Assignee: U-Pixel Technologies Inc., Hsinchu (TW)

( * ) Notice: Subject to any disclaimer, the term of this patent is extended or adjusted under 35 U.S.C. 154(b) by 185 days.

(21) Appl. No.: 12/543,966

(22) Filed: Aug. 19, 2009

(65) Prior Publication Data

US 2011/0042152 A1 Feb. 24, 2011

(51) Int. Cl.
*G06F 3/041* (2006.01)

(52) U.S. Cl.
USPC ........................................................ 345/173

(58) Field of Classification Search
USPC ............. 345/156, 173–178; 178/18.01, 18.03
See application file for complete search history.

(56) References Cited

U.S. PATENT DOCUMENTS

| | | | |
|---|---|---|---|
| 5,565,658 A * | 10/1996 | Gerpheide et al. ......... | 178/18.02 |
| 5,861,875 A | 1/1999 | Gerpheide | |
| 7,084,860 B1 | 8/2006 | Jaeger et al. | |
| 2007/0109274 A1* | 5/2007 | Reynolds ....................... | 345/173 |
| 2007/0257890 A1* | 11/2007 | Hotelling et al. ............. | 345/173 |
| 2012/0319996 A1 | 12/2012 | Hotelling et al. | |

FOREIGN PATENT DOCUMENTS

| CN | 1175315 A | 3/1998 |
|---|---|---|
| CN | 101479692 A | 7/2009 |
| TW | 200529052 A | 9/2005 |

* cited by examiner

*Primary Examiner* — Chanh Nguyen
*Assistant Examiner* — Ram Mistry

(57) ABSTRACT

A touch sensing apparatus utilizes the characteristics of orthogonal vectors is disclosed. A random spread spectrum (RSS) signal or a periodic wave is used to modulate a driving signal so as to driving a row of a sensing array, and the RSS signal or periodic wave is also use to extract touch information of a node from a sensing signal measured from a column of the sensing array. The node is an intersection of the driven row and the measured column. When different RSS signals and/or periodic waves are used to drive multiple rows simultaneously, multipoint touching information can be obtained from the same sensing signal at the same time by respectively using the RSS signals and/or periodic waves to extract touching information of multiple points which are the intersections of the driven rows and the measured column.

14 Claims, 14 Drawing Sheets

FIG. 16        600

TOUCH SENSING APPARATUS AND METHOD USING DIFFERENT MODULATED DRIVING SIGNALS

TECHNICAL FIELD OF THE INVENTION

The present invention relates to touch sensing, more particularly, to touch sensing apparatuses with low noise and being able to perform multipoint touch sensing.

BACKGROUND OF THE INVENTION

A touch panel utilizes a sensing array to detect a position and strength of a touch done by a finger, stylus or the like. FIG. 1 is a schematic diagram showing a general touch sensing apparatus 1 (e.g. a touch panel) having a sensing array 10. The sensing array 10 comprises a group of longitudinal conductive traces and a group of lateral conductive traces arranged as columns and rows of X-Y coordinates or arranged as polar coordinates, and a number of sensing elements (not shown) provided at the respective intersections. The sensing elements are usually implemented by resistors or capacitors, for example. A control unit 12 sends a driving signal to drive a row i of the sensing array 10 through a multiplexer 16. A sensing signal of the respective columns j of the driven row i are sequentially or simultaneously detected by the control unit 12 to determine the touch position and strength via a multiplexer 14. By checking values of the sensing signals, the touch position and strength can be known. For example, assuming a row has 16 nodes (i.e. 16 columns are intersected with each row), if the signal values of the sensing signal for the 16 nodes for a specific row are (0, 0, 0, 1, 2, 3, 4, 3, 2, 1, 0, 0, 0, 0, 0, 0), it means the seventh node gets a stronger touch. However, the sensing elements are sensitive to noises. Therefore, the values of the sensing signals are easily influenced so that it is difficult to accurately distinguish the touch position and determine the touch strength.

Nowadays, touch sensing apparatuses such as touch panels have been widely used in various applications and get involved in many complicated functional operations such as wireless communication. Therefore, the touch panels may be interferences by various noises such as 1/f noise, white noise, power noise, 50/60 Hz noise, microwave (e.g. infrared, blue tooth etc.) noise, backlight noise or the like. The various noises are dispersed in different frequency bands. FIG. 2 shows the various noises and the how a signal is coupled with the noises. The upper diagram shows the distribution of the various noises such as 1/f noise 23, 60 Hz noise 25, local noises 27 and white Gaussian noise 29. The DC signal is indicated by a black arrow 21. The middle diagram shows an ideal sensing signal. The lower diagram shows a noise-coupled sensing signal. Generally, high frequency noises can be filtered off by using a low pass filter. However, if we attempt to filter off the noises of lower frequency bands by using a low pass filter with a low cut off frequency to extract DC term (i.e. the required signal), response time of the filter is slow. For example, if a cut off frequency of 10 Hz is used to filter off the 60 Hz noise, the response time will be delayed by 0.1 second. Such a delay will cause inconvenience in the operation of the touch panel.

In conventional modulation/demodulation technique, a carrier of frequency f1 can be used to modulate a voltage or current diving signal to driving rows and columns of the sensing array. Then the sensing signal obtained from the sensing array is demodulated by a demodulation signal of a frequency f2. By doing so, signals of frequencies of (f1+f2) and (f1−f2) are generated. If a low pass filter with a cut off frequency lower than (f1+f2)/2, then the high frequency components can be filtered off, and the low frequency component can be obtained. When f1=f2, the low frequency is the DC term, which is the required sensing signal. The touch event can be known from the DC term. The change of the DC term corresponds to the capacitance or resistance variance due to a touch. However, the carrier used to modulate the driving signal must be chosen to be in a band with low noise. If the carrier is of a band with high noise, SNR of the sensing signal will be degraded. Therefore, the carrier (i.e. modulation signal) must be selected from a low noise band. To know which one of the frequency bands has the lowest noise, it is required to scan and check all the bands. This increases the hardware and time costs.

Traditionally, the touch panel can only extract information of one node (i.e. an intersection of a column and a row) of the sensing array at a time. When the area of the touch panel is huge, the sensing array has a great number of columns and a great number of rows. Accordingly, there may be thousands of nodes in the sensing array. To scan a frame, thousands of measurements are required, so that the response time is long. Therefore, there is a need for a technique for rapidly and efficiently scanning the sensing array to check if there are touch events occurred to the touch panel.

SUMMARY OF THE INVENTION

An objective of the present invention is to provide a touch sensing apparatus being able to disperse noise interferences of different frequencies. Another objective of the present invention is to provide a touch sensing apparatus being able to perform multipoint touch sensing in an efficient manner.

In accordance with an aspect of the present invention, a touching sensing apparatus comprises a sensing array having multiple rows and multiple columns intersecting with each other to define multiple nodes; a modulation signal generator for providing a modulation signal; a signal source receiving the modulation signal from the modulation signal generator to provide a modulated driving signal to drive a row of the sensing array; and a demodulator receiving a sensing signal measured from a column of the sensing array and demodulating the sensing signal with the modulation signal provided by the modulation signal generator to extract touching information of a node, which is an intersection of the driven row and the measured column. The modulation signal generator can be a pseudorandom noise (PN) code generator providing a PN code or a periodic wave generator providing a periodic wave such as a square wave or a sine wave.

In accordance with another aspect of the present invention, a touching sensing apparatus comprises a sensing array having multiple rows and multiple columns intersecting with each other to define multiple nodes; a signal source for providing a driving signal; and a plurality of signal processing units. Each signal processing unit comprises a modulation signal generator for providing a modulation signal to the signal source so as to generate a modulated driving signal to drive a row of the sensing array; and a demodulator receiving a sensing signal measured from a column of the sensing array and demodulating the sensing signal with the modulation signal provided by the modulation signal generator. The modulation signal generators of the respective signal processing units provide different modulation signals so as to generate different modulated driving signals to drive different rows of the sensing array. The sensing signal of the measured column is provided to the demodulators of the respective signal processing units. Each demodulator demodulates the sensing signal with the modulation signal provided by the modulation signal generator of the same signal processing unit to extract touching information of a node, which is an intersection of the row driven by the same modulation signal and the measured column. Each modulation signal generator can be a pseudorandom noise (PN) code generator providing a PN code or a periodic wave generator providing a periodic wave such as a square wave or a sine wave.

In accordance with a further aspect of the present invention, a touching sensing apparatus comprises a sensing array having multiple rows and multiple columns intersecting with each other to define multiple nodes; a signal source for providing a driving signal; and a plurality of signal processing units. Each signal processing unit comprises a PN code generator for providing a PN code; a periodic wave generator for providing a periodic wave; a first multiplexer for selecting the PN code or the periodic wave as a modulation signal and providing the selected modulation signal to the signal source to generate a modulated driving signal; a first demodulator receiving a sensing signal measured from a column of the sensing array and demodulating the sensing signal with the PN code; a second demodulator receiving a sensing signal measured from a column of the sensing array and demodulating the sensing signal with the periodic wave, and a second multiplexer for selecting an output of the first or second demodulator depending on which of the PN code and the periodic wave is selected as the modulation signal. The respective signal processing units provide different modulation signals so as to generate different modulated driving signals to drive different rows of the sensing array. The sensing signal of the measured column is provided to the demodulators of the respective signal processing units. Each demodulator demodulates the sensing signal with the selected modulation signal of the same signal processing unit to extract touching information of a node, which is an intersection of the row driven by the same modulation signal and the measured column.

In accordance with still a further aspect of the present invention, a touching sensing apparatus comprises a sensing array having multiple rows and multiple columns intersecting with each other to define multiple nodes; a signal source for providing a driving signal; and a plurality of channels. Each channel comprises a plurality of signal processing units, and each signal processing unit may have a kind of structures mentioned above.

BRIEF DESCRIPTION OF THE DRAWINGS

The present invention will be described in detail in conjunction with the appending drawings, in which.

DETAILED DESCRIPTION OF THE INVENTION

Figure 1:
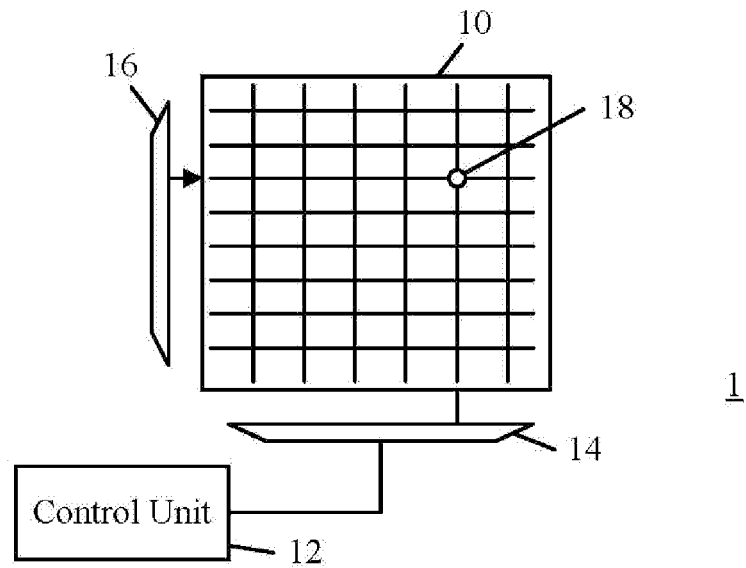
FIG. 1 is a schematic diagram showing a general touch sensing apparatus.
Figure 2:
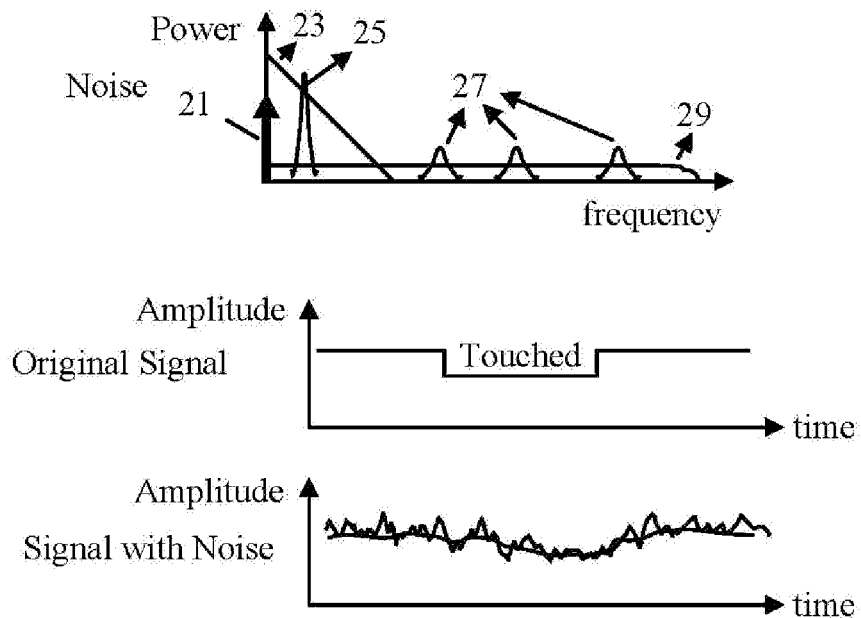
FIG. 2 shows distribution of noises and how a sensing signal is coupled with the noises.

The present invention utilizes characteristics of orthogonal vectors. Assuming each vector of a vector group is Vi, where i=0, 1, . . . , n. If the product of a vector with a different vector is 0 (i.e. Vi×Vj=0, where i≠j), and the product of a vector with itself is 1 (i.e. Vi×Vj=1, where i=j), the this is an orthogonal vector group. When V1=(a1, b1, c1, d1) and V2=(a2, b2, c2, d2), then the product of V1×V2 equals to a1×a2+b1×b2+c1×c2+d1×d2. For example, if the vector group includes two vectors: V1=(0, 0, 0, 1) and V2=(0, 0, 1, 0), it is satisfied that V1×V1=1, V1×V2=0, and V2×V2=1. Therefore, V1 and V2 are orthogonal with each other.

Any signal can be represented by an orthogonal vector group as S=c1V1+c2V2+c3V3+ . . . +cnVn, where c1, c2, . . . , cn are coefficients. If the environmental noises are represent as N=100V1+50V2+20V3+10V4+2V5+4V6+10V7 . . . , where each of the vectors V1, V2, . . . indicates a component of a specific frequency band. For a known signal A, if V5 is selected as a modulation vector, then the modulated signal (i.e. input signal) Si=AV5. As known, the signal will be coupled by the noises, therefore, an output signal So=AV5+100V1+50V2+20V3+10V4+2V5+4V6+10V7 . . . =100V1+50V2+20V3+10V4+(A+2)V5+4V6+10V7 . . . . If we utilize the same vector V5 as a demodulation vector, then the recovered signal Sr=So×V5=100×0+50×0+20×0+10×0+(A+2)×1+4×0+10×0 . . . =A+2.

If we use two different vectors to modulate two signals, we can extract the two signals by using the two different vectors as demodulation vectors. For example, assuming a vector V5 is selected to modulate a signal A, and a different vector V6 is selected to modulate another signal B, then an input signal is Si=AV5+BV6. The input signal is coupled with noises, then an output signal will be So=AV5+BV6+100V1+50V2+20V3+10V4+2V5+4V6+10V7 . . . =100V1+50V2+20V3+10V4+(A+2)V5+(B+4)V6+10V7 . . . . When we use the vector V5 to demodulate the output signal, the signal A can be recovered as SrA=So×V5=100×0+50×0+20×0+10×0+(A+2)×1+(B+4)×0+10×0 . . . =A+2. If the vector V6 is used to demodulate the output signal, the signal B can be recovered as SrB=So×V6=100×0+50×0+20×0+10×0+(A+2)×0+(B+4)×1+10×0 . . . =B+4. By using multiple different vectors, multipoint of a sensing array can be processed at the same time. The details will be further described later.

As can be seen, only a little noise will be left with the recovered signal. However, as mentioned above, to lower the noises, the low noise component (e.g. V5 in this example) should be selected as the modulation and demodulation vector.

In order to avoid scanning all the bands to find the band with the least noise, we utilize the random spread spectrum (RSS) technique. Each selected vector for modulation and demodulation is a random combination of frequencies, and therefore the recovered signal will be seriously attacked by noises of a specific band. Preferably, the selected vector changes from time to time. For example, at time t1, a selected vector is (¼)V3+(¼)V5+(¼)V7+(¼)V8, and at time t2, a selected vector is (⅓)V4+(⅓)V5+(⅓)V8. In practice, pseudorandom noise (PN) code technique can be used.

Figure 3:
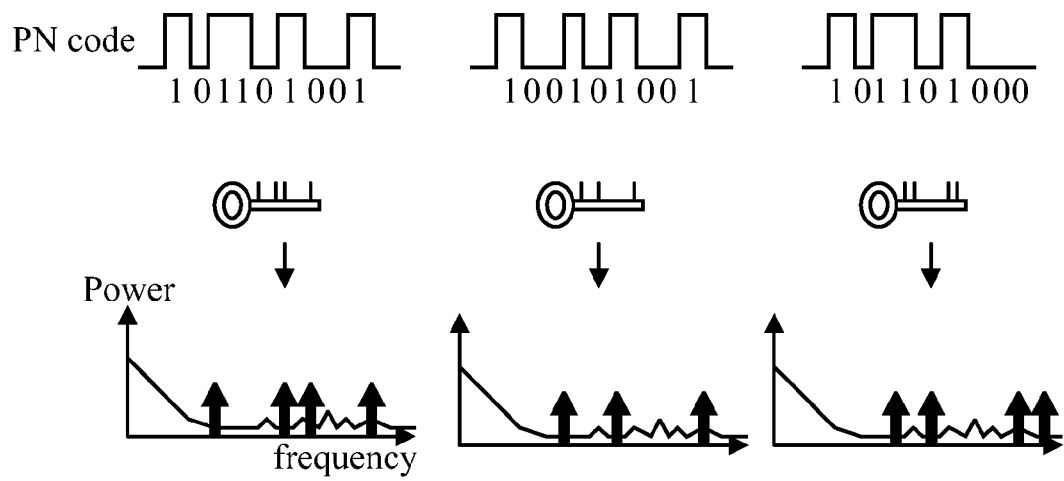
FIG. 3 is a schematic diagram showing three PN codes and power spectrums thereof.
Figure 4:
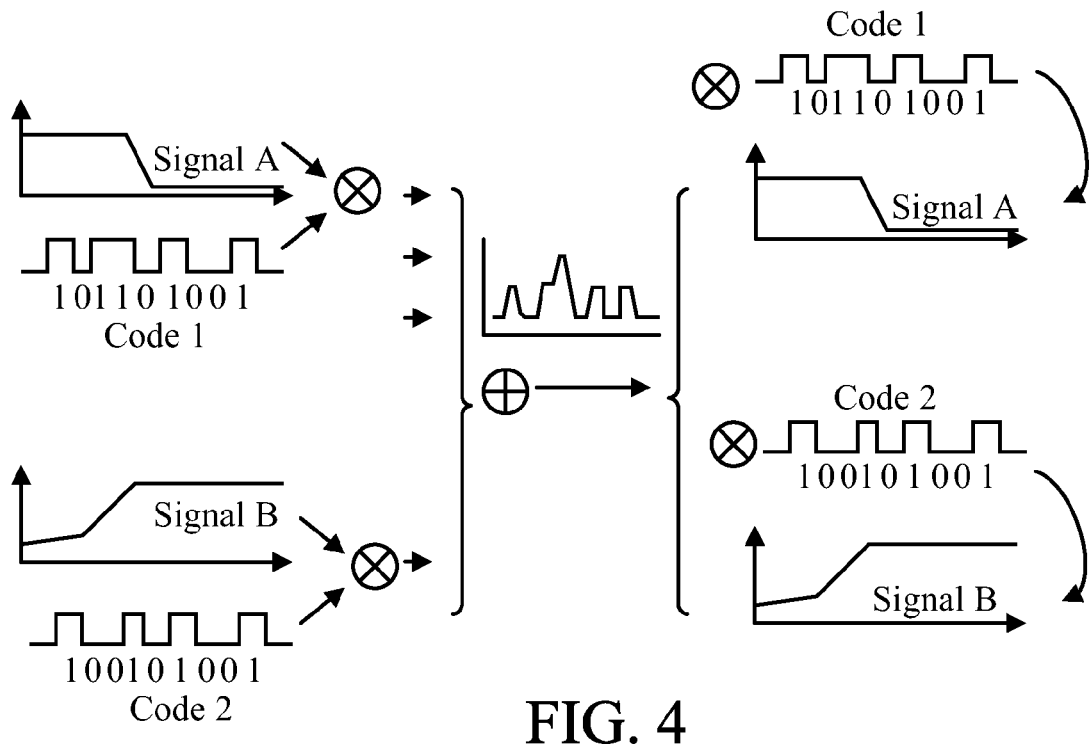
FIG. 4 is a schematic diagram showing modulation and demodulation for two signals in accordance with the present invention.

FIG. 3 is a schematic diagram showing three different PN codes and power spectrums thereof. Each PN code is like a specific key. As can be seen, power components of the three PN codes indicated by black arrows disperse at different frequencies. Therefore, spread spectrum can be attained. FIG. 4 is a schematic diagram showing modulation and demodulation for two signals A and B in accordance with the present invention. The signal A is modulated by code 1 and the signal B is modulated by code 2. The modulated signals are combined as a combination signal Sc. The signal A can be recovered from the combination signal Sc by using code 1 to demodulate the combination signal Sc. The signal B can be recovered from the combination signal Sc by using code 2 to demodulate the combination signal Sc.

Figure 5:
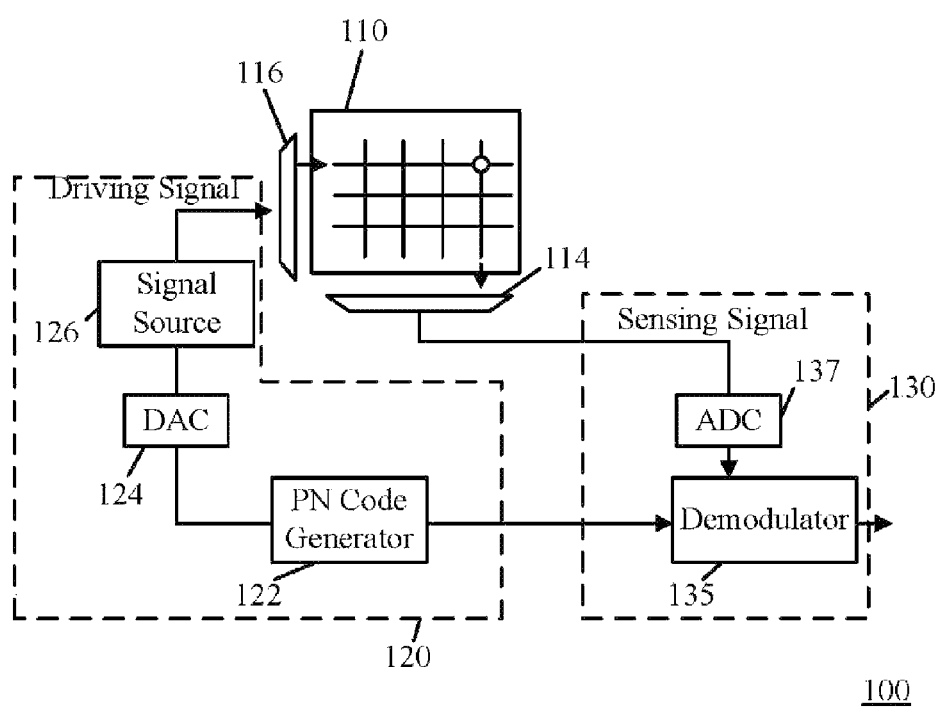
FIG. 5 is a schematic diagram showing a touch sensing apparatus in accordance with a first embodiment of the present invention.

FIG. 5 is a schematic diagram showing a touch sensing apparatus 100 in accordance with a first embodiment of the present invention. The touch sensing apparatus 100 (e.g. a touch panel) includes a sensing array 110 having a number of conductors intersecting as columns and rows, each intersection (i.e. a node) is provided with a sensing element (not shown) such as a capacitor or a resistor. In the present embodiment, the touch sensing apparatus 100 includes a driving circuit 120 and a sensing circuit 130. The driving circuit 120 has a modulation signal generator, which is implemented by a PN code generator 122 in the present embodiment. The PN code generator 122 randomly generates a code as a modulation signal, which is digital. The code is converted into an analog code waveform by a digital-to-analog converter (DAC) 124. The analog code waveform is used to modulate a driving signal, which can be a voltage or current signal, provided by a signal source 126. The PN code modulated driving signal is sent to a row of the sensing array 110 through a multiplexer 116. Then, an analog sensing signal of one node of the driven row is converted to a digital sensing signal by an analog-to-digital converter (ADC) 137 and sent to a demodulator 135 of the sensing circuit 130. The demodulator 135 demodulates the sensing signal by using the same code so as to extract touching information of the node. It is noted that the PN code generator 122 is shared by the driving circuit 120 and the sensing circuit 130. Therefore, the PN code generator 122 may also be considered as a component of the sensing circuit 130.

Figure 6:
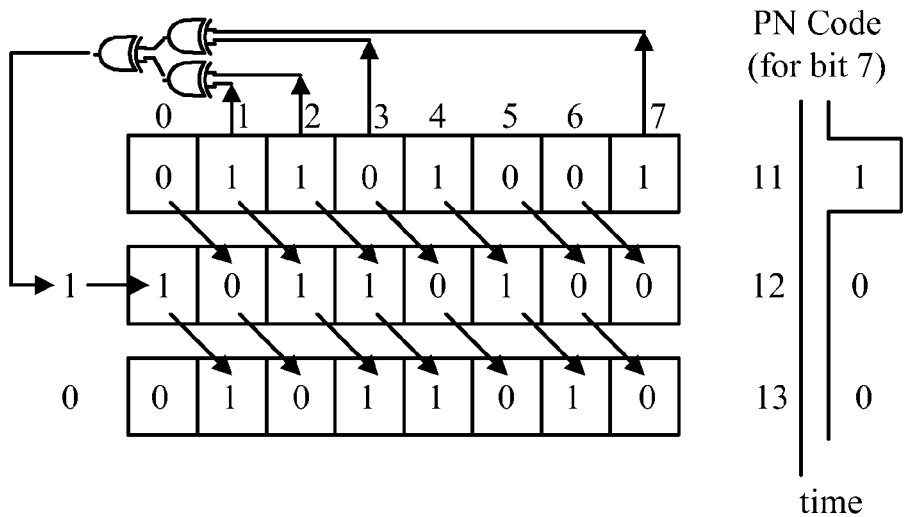
FIG. 6 shows a linear feedback shift register (LFSR) random code generator.

FIG. 6 shows an example of a linear feedback shift register (LFSR) random code generator, which can be used to implement the PN code generator 122 of FIG. 5. LFSR random code generator is not the main feature of the present invention but only an implementation of the PN code generator 122. In addition, LFSR random code generator is widely known in this field, and therefore it will not be described in detail herein. As can be seen, the PN code used to modulate the driving signal is 1 at time t1, 0 at t2, 0 at t3.

Figure 7:
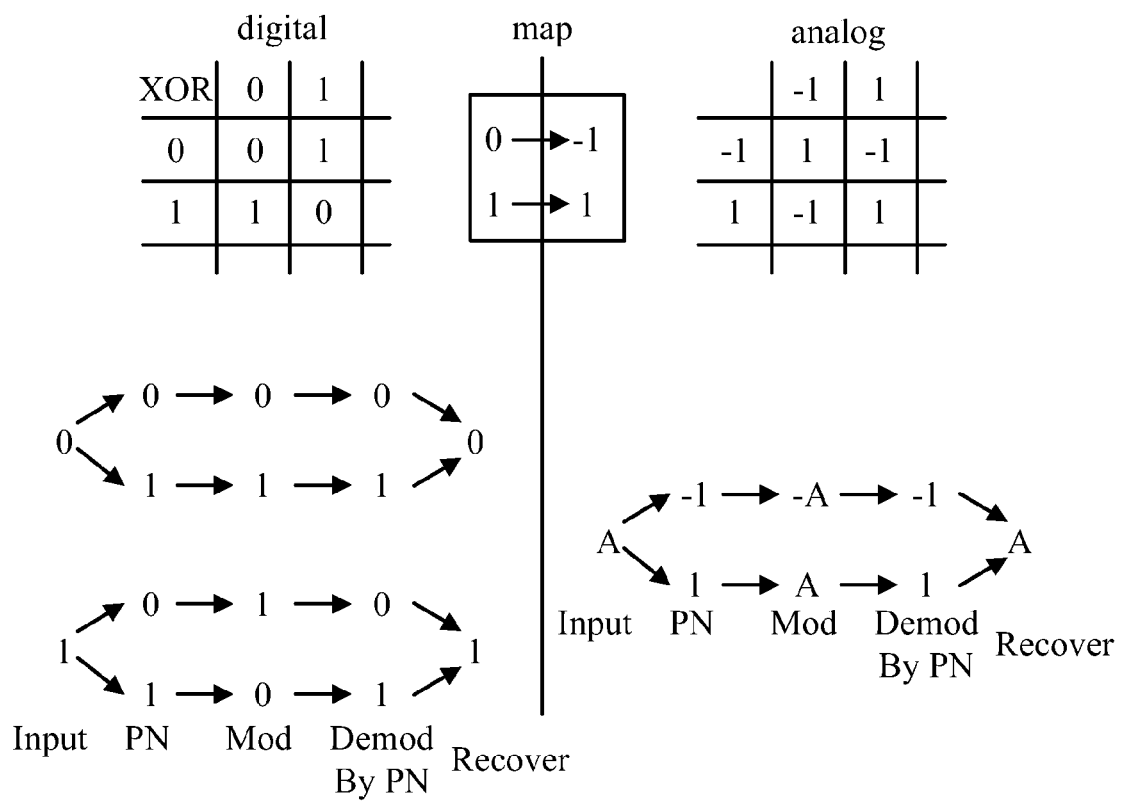
FIG. 7 illustrates modulation and demodulation for digital and analog signals.

In the embodiment shown in FIG. 5, the PN code is converted into an analog signal and then is used to modulate the driving signal. However, it is possible to perform modulation and demodulation in digital or analog form. FIG. 7 illustrates modulation and demodulation for digital and analog signals. The left portion shows modulation and demodulation for a digital signal, in which XOR algorithm is used. As can be seen, in a case that an input bit is 0, when PN code bit, which is used to modulate and demodulate the input bit, is 0, the modulated result is also 0, and the recovered bit is 0; when PN code bit is 1, the modulated result is also 1, and the recovered bit is 0. In a case that an input bit is 1, when PN code bit is 0, the modulated result is 1, and the recovered bit is 1; when PN code bit is 1, the modulated result is 0, and the recovered bit is 1. If the modulation and demodulation are executed in analog form, then the PN code bits 0 and 1 should be converted to levels −1 and +1. In analog case, multiplication is used. As can be seen, assuming an input signal is A, when PN code signal, which is used to modulate and demodulate the input signal, is −1, the modulated result is −A, and the recovered signal is A. When PN code signal is +1, the modulated result is A, and the recovered signal is A.

Figure 8:
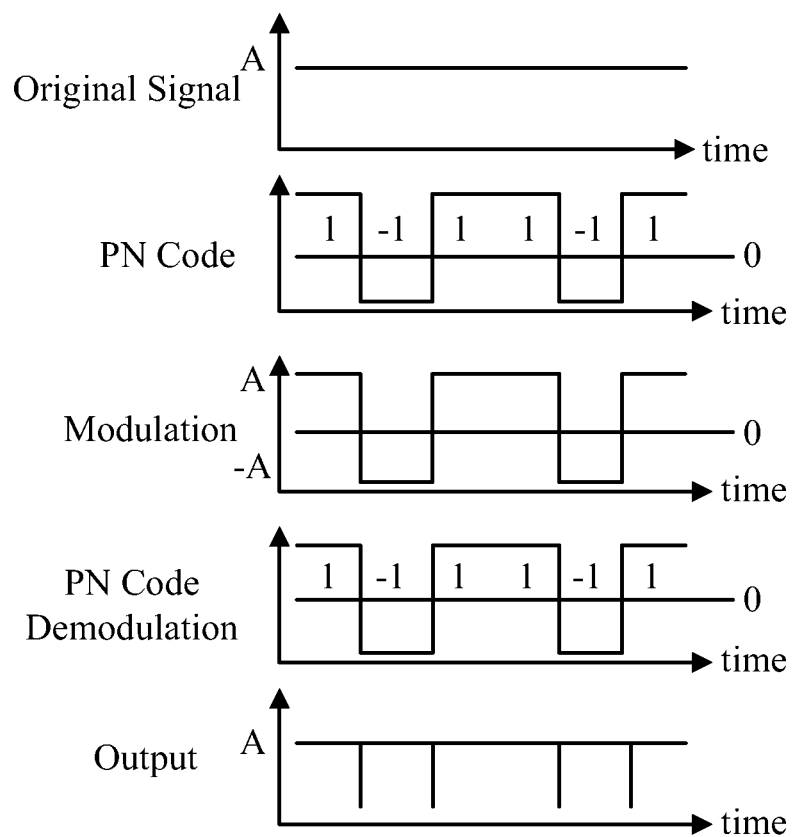
FIG. 8 shows ideal modulation and demodulation for an original signal by using a PN code.

FIG. 8 shows ideal modulation and demodulation for an original signal A by using a PN code. In this example, the PN code is converted into a series of +1 and −1 as (1, −1, 1, 1, −1, 1). The PN code is used to modulate the original signal to obtain a modulated signal as (A, −A, A, A, −A, A). If the same PN code (1, −1, 1, 1, −1, 1) is used to demodulate the modulation signal, then an output is obtained as the recovered original signal.

Figure 9:
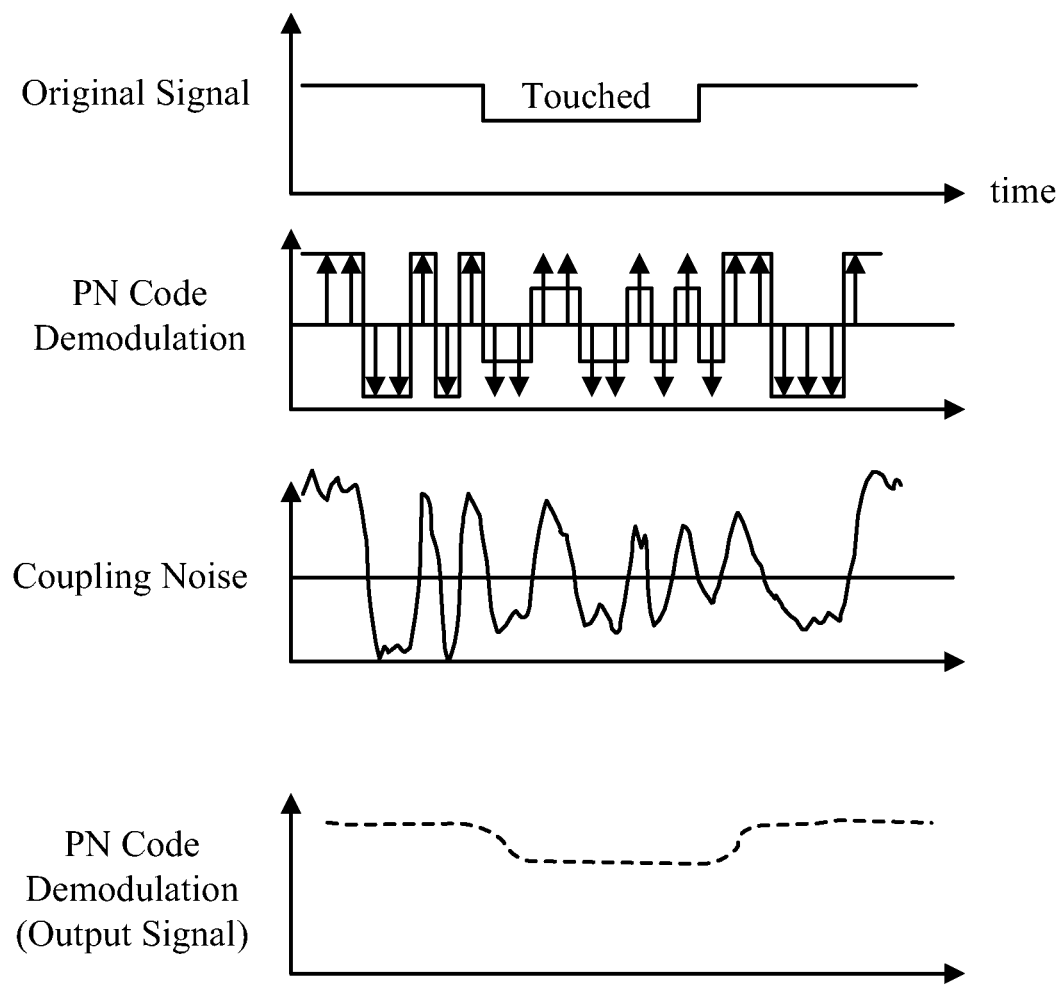
FIG. 9 shows practical modulation and demodulation for an original signal by using a PN code.

FIG. 9 shows practical modulation and demodulation for an original signal by using a PN code. An original signal indicates a touch event. As can be seen from the drawing, the PN code modulated signal is coupled with noises and is distorted. After being demodulated by using the same PN code, a recovered signal is obtained as shown in the bottom of the drawing.

Figure 10:
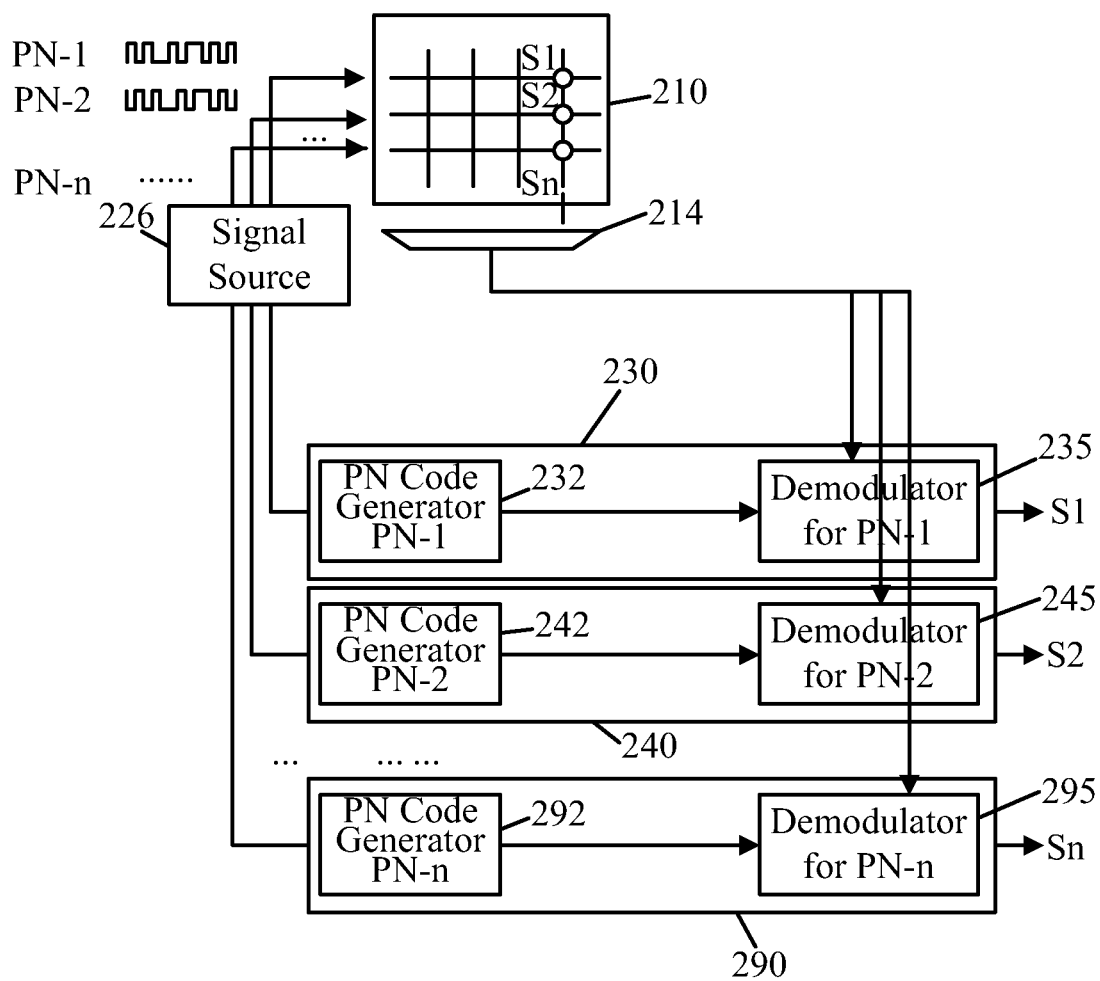
FIG. 10 is a schematic diagram showing a touch sensing apparatus in accordance with a second embodiment of the present invention.

FIG. 10 is a schematic diagram showing a touch sensing apparatus 200 in accordance with a second embodiment of the present invention. The touch sensing apparatus 200 includes a sensing array 210. For simultaneously processing information of multipoint of the sensing array 210, the touch sensing apparatus 200 comprises a plurality of PN code generators indicated by reference numbers 232, 242, . . . , 292 and a plurality of demodulators 235, 245, . . . , 295. It is noted that ADC and DAC as described in the first embodiment are omitted herein for the sake of simplification and clarification. The first PN code generator 232 and the first demodulator 235 can be referred to as a first signal processing unit 230, the rest can be deduced accordingly. A voltage or current signal generated by a signal source 226 is modulated with a PN code PN-1 provided by the PN code generator 232 to generate a first modulated driving signal used to driving a row. The signal of the signal source 226 is modulated with a PN code PN-2 provided by the PN code generator 242 to generate a second modulated driving signal used to driving another row. The rest can be deduced accordingly. Similarly, the signal of the signal source 226 is modulated with a PN code PN-n provided by the PN code generator 292 to generate an nth modulated driving signal used to driving a different row. Information of a specific column is extracted through a multiplexer 214 as a sensing signal. The touching information of nodes S1, S2, . . . , Sn are all included in the sensing signal. By respectively demodulating the sensing signal with the different PN codes PN-1, PN-2, ..., PN-n, the touching information of the nodes S1, S2, ..., Sn can be respectively obtained. For example, if the sensing array 210 has 40 rows and 50 columns, then 2000 times of measurements are required for the 2000 nodes by using single point touch sensing. If five rows are driven each time, then only 400 times of measurements are required. The technique can be better understood by referring to the following description.

Figure 11:
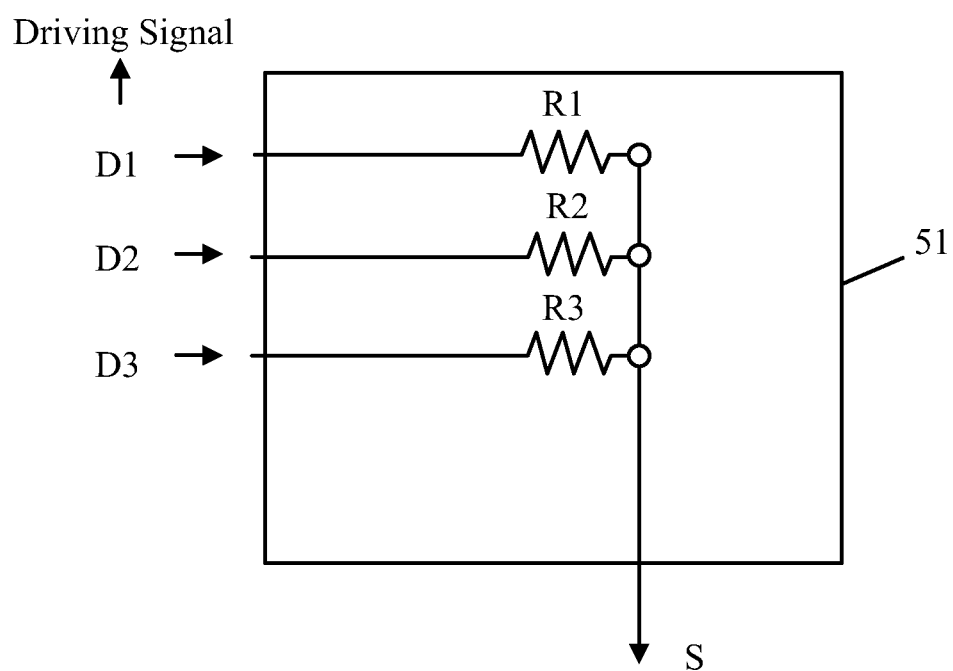
FIG. 11 is a schematic diagram illustrating a sensing signal of multiple points and driving signals for those points.

FIG. 11 is a schematic diagram illustrating a sensing signal of multiple points and driving signals for those points. In this example, driving signals D1, D2, D3 are voltage signals, which are respectively modulated with vectors V1, V2, V3. Sensing elements of a sensing array 51 are resistors R1, R2, R3. For row 1, the current i1=D1/R1. For row 2, the current i2=D2/R2. For row 3, the current i3=D3/R3. When a specific column is detected, a sensing signal S including touching information of nodes S1, S2, S3 is measured. The sensing signal S is a current signal, then S=i1+i2+i3=D1/R1+D2/R2+D3/R3. The sensing signal S is demodulated with the vectors V1, V2, V3, respectively, as:

$S \times V1 = 1/R1 + 0 + 0 \rightarrow$ touching information of $S1$ $S \times V2 = 0 + 1/R2 + 0 \rightarrow$ touching information of $S2$ $S \times V3 = 0 + 0 + 1/R3 \rightarrow$ touching information of $S3$ Accordingly, the touching information of node S1, the touching information of node S2, the touching information of node S3 are respectively obtained.

Figure 12:
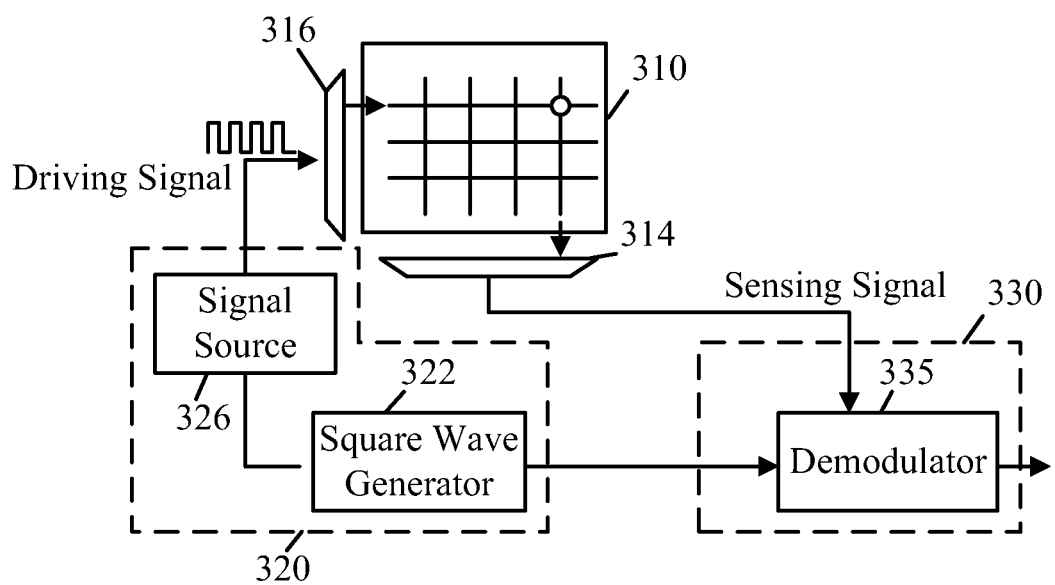
FIG. 12 is a schematic diagram showing a touch sensing apparatus in accordance with a third embodiment of the present invention.

FIG. 12 is a schematic diagram showing a touch sensing apparatus 300 in accordance with a third embodiment of the present invention. In this embodiment, the sensing apparatus 300 is similar to the sensing apparatus 100 in FIG. 5. The only difference is that the modulation signal generator is implemented by a periodic wave generator (e.g. a square wave or sine wave generator) 322 in the present embodiment. It is noted that DAC and ADC are omitted herein for the sake of simplification. A periodic wave (e.g. square wave) provided by the periodic wave generator 322 is used as a modulation signal to modulate a voltage or current signal of a signal source 326 to generate a modulated driving signal to driving a row of a sensing array 310 through a multiplexer 316. A specific column is detected through a multiplexer 314 and a sensing signal of a node, which is the intersection of the driven row and the detected column, is obtained. The sensing signal is demodulated with the same periodic wave by a demodulator 335 so as to obtain the touching information of the node.

Figure 13:
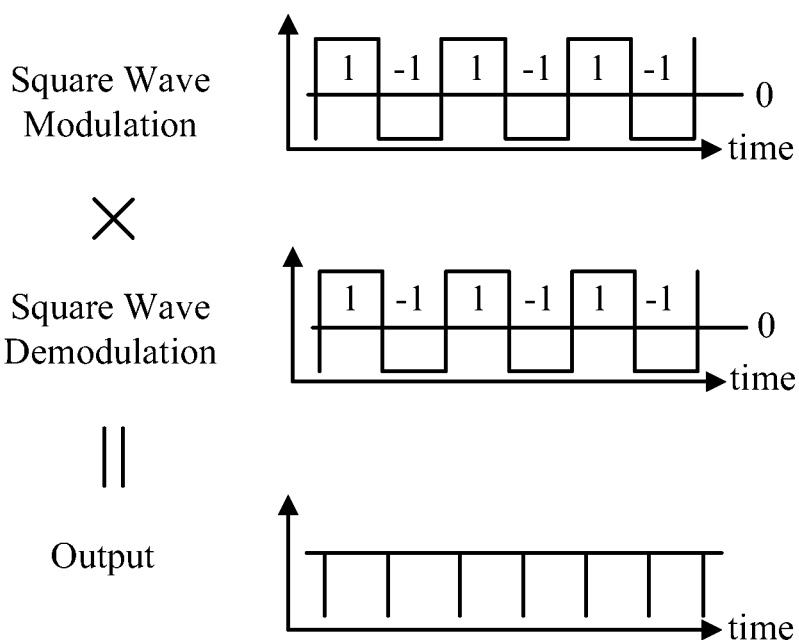
FIG. 13 shows modulation and demodulation of the touch sensing apparatus of FIG. 12.

FIG. 13 shows modulation and demodulation of the touch sensing apparatus of FIG. 12. As can be seen, when the same square wave (or any other kind of periodic wave) is used in modulation and demodulation, the signal is recovered. Although periodic wave lacks the advantage of dispersing the noise interferences as the random spread spectrum signal as described above, the periodic wave has another advantage of being easily controllable. When being applied to multipoint touch sensing, such an advantage becomes outstanding.

Figure 14:
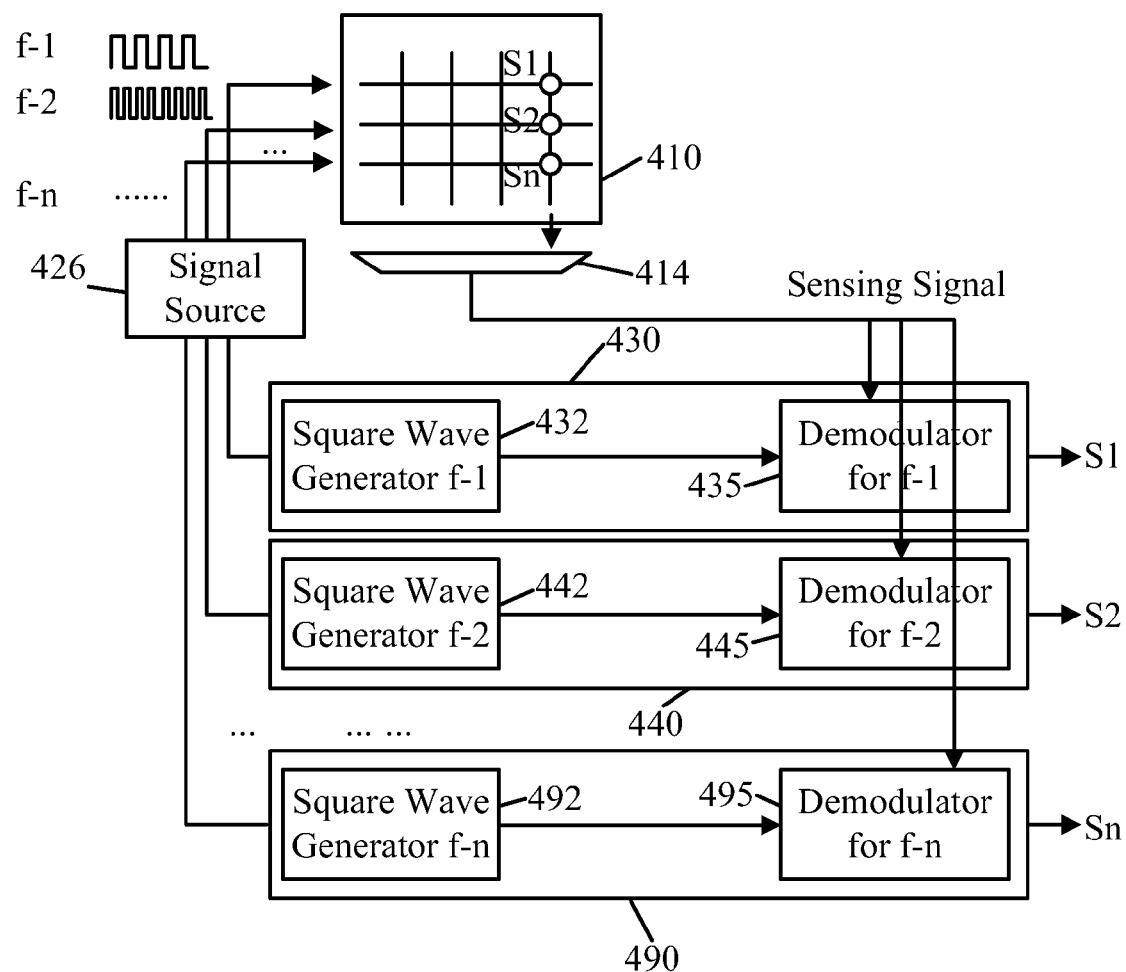
FIG. 14 is a schematic diagram showing a touch sensing apparatus in accordance with a fourth embodiment of the present invention.

FIG. 14 is a schematic diagram showing a touch sensing apparatus 400 in accordance with a fourth embodiment of the present invention. The touch sensing apparatus 400 is similar to the touch sensing apparatus 200 in FIG. 10, except that the PN code generators are all replaced by periodic wave generators 432, 442, ..., 492. The periodic wave generators 432, 442, ..., 492 can be implemented by square wave generators or sine wave generators, for example. The periodic wave generators 432, 442, ..., 492 respectively provide periodic waves (e.g. square waves or sine waves) of different frequencies f-1, f-2, ..., f-n to modulate a signal provided by a signal source 426 so as to generate different driving signal for driving rows of a sensing array 410. It is preferred that the different frequencies are separated from each other by an interval of at least 10 kHz. The determination of the interval relates the time of measurement. The longer the time to measure a column is, the narrower the noise bandwidth is. Accordingly, the interval can be smaller. In addition, the period of each periodic wave is less than 50 µs. Since the frequencies of the periodic waves are fixed and separated from each other, the interferences between different driving signals can be reduced or even eliminated. The periodic waves of different frequencies f-1, f-2, ..., f-n are also used in demodulators 435, 445, ..., 495, respectively, to extract touching information of nodes S1, S2, ..., Sn. As the touch sensing apparatus 200, the first periodic wave generator 432 and the first demodulator 435 of the touch sensing apparatus 400 can be referred to as a first signal processing unit 430, the rest can be deduced accordingly.

Figure 15:
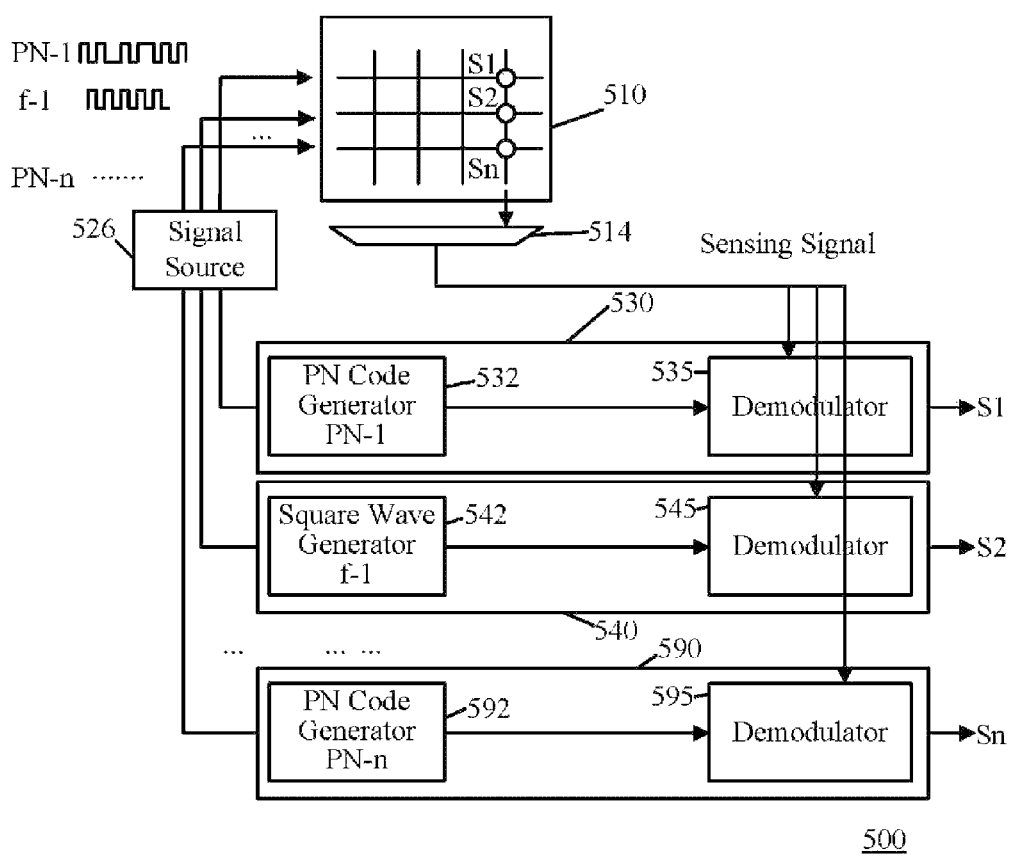
FIG. 15 is a schematic diagram showing a touch sensing apparatus in accordance with a fifth embodiment of the present invention.

The random spread spectrum signal and periodic wave can be both used in touch sensing in hybrid. That is, some of the signal pressing units have PN codes generators while the other ones have periodic wave generators. FIG. 15 is a schematic diagram showing a touch sensing apparatus 500 in accordance with a fifth embodiment of the present invention. In the touch sensing apparatus 500, signal processing units containing PN code generators and signal processing units containing periodic wave generators are arranged alternately. That is, the rows of the sensing array 510 are driven by the PN code modulated driving signals and the periodic wave modulated driving signals alternately. For example, a signal processing unit 530 has a PN code generator 532 for generating a PN code PN-1, a signal processing unit 540 next to the signal processing unit 530 has a periodic wave generator 542 for generating a periodic wave of a frequency f-1. For the convenience of description, the signal processing unit 530 can be called as a random signal processing unit, while the signal processing unit 540 can be called as a periodic signal processing unit. It is noted that the random signal processing units and the periodic signal processing units can be arranged in any other hybrid form. The PN codes and periodic waves are used to generate driving signals to drive rows of a sensing array 510, and are used to extract touching information of nodes from a specific column of the sensing array 510 through a multiplexer 514, respectively. In the touch sensing apparatus 500, the random spread spectrum signals and periodic waves are utilized in a space hybrid form. That is, the provision of the random spread spectrum signals and periodic waves are hybrid on the hardware structure. However, the random spread spectrum signals and periodic waves can also be utilized in a time hybrid form.

Figure 16:
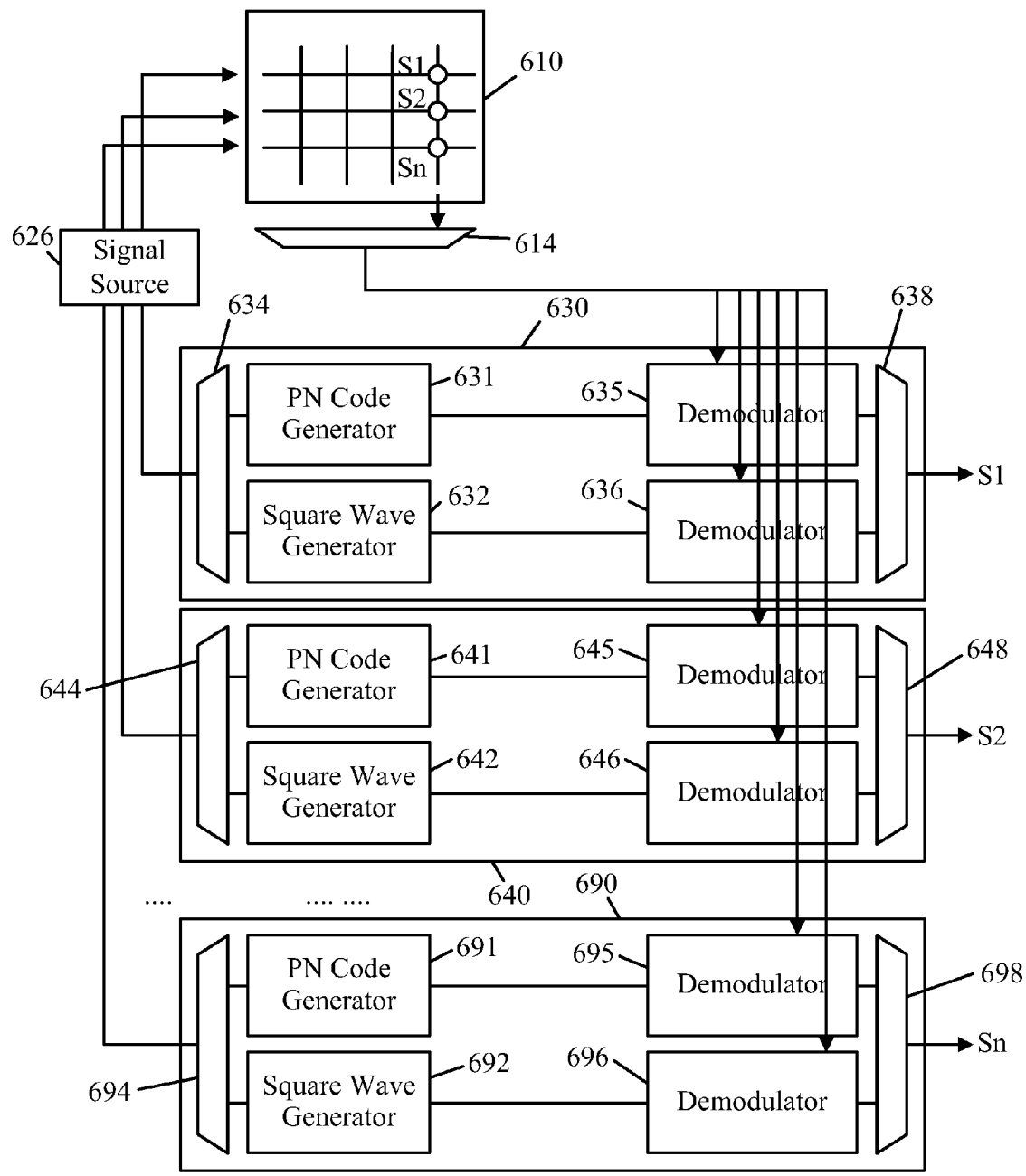
FIG. 16 is a schematic diagram showing a touch sensing apparatus in accordance with a sixth embodiment of the present invention.

FIG. 16 is a schematic diagram showing a touch sensing apparatus 600 in accordance with a sixth embodiment of the present invention. As the touch sensing apparatuses described above, the touch sensing apparatus 600 also comprises a plurality of signal processing units 630, 640, ..., 690. Each signal processing unit such as the signal processing unit 630 comprises a PN code generator 631 and a periodic wave generator (e.g. square wave generator) 632, two modulation units 635, 636 respectively connected with the PN code generator 631 and the periodic wave generator 632. A PN code generated by the PN code generator 631 or a periodic wave generated by the periodic wave generator 632 is selected to output through a multiplexer 634 to modulate a voltage or current signal provided by a signal source 626 to form a modulated driving signal. The driving signal is used to drive a row of a sensing array 610. A sensing signal measured from a column of the sensing array is picked up through a multiplexer 614 and sent to the demodulators 635, 636 to extract touching information of a node which is the intersection of the driven row and the measured column. A demodulated signal from the demodulators 635 or 636 is output through a multiplexer 638. If the PN code is used to generate the driving signal, then the demodulated signal from the demodulator 635 is selected to be output. If the periodic wave is used to generate the driving signal, then the demodulated signal from the demodulator 636 is selected to be output. For the signal processing unit 630, it is possible to use the PN code at time t1, while use the periodic wave at time t2. That is, the multiplexer 634 changes its selection between the PN code and the periodic wave at different times. Other signal processing units operate in the same way. The PN codes and periodic waves of the signal processing units can be arranged alternately. For example, at time t1, the first signal processing unit 630 selects to use a PN code PN-1, while the second signal processing unit 640 selects to use a periodic wave of a frequency f-1, and the rest can be deduced accordingly. Other arrangement manners are also possible. The signal processing units provide various PN codes and periodic waves of different frequencies at the same time to generate multiple driving signals, so that multiple rows of the sensing array 610 are driving at the same time. The sensing signal is then modulated by corresponding PN codes and periodic waves, respectively. By doing so, touching information of multipoint can be extracted at the same time.

Figure 17:
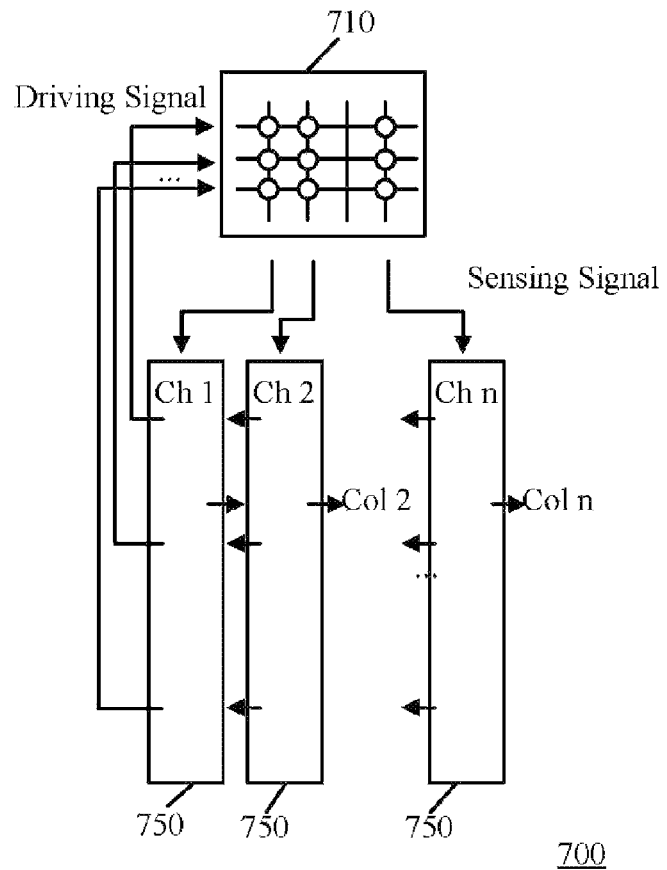
FIG. 17 is a schematic diagram showing a touch sensing apparatus in accordance with a seventh embodiment of the present invention.

In each of the above embodiments, only one channel is used. That is, only a column is detected at a time. Therefore, the touching information of multipoint at the same column for different rows is obtained at a time. FIG. 17 is a schematic diagram showing a touch sensing apparatus 700 in accordance with a seventh embodiment of the present invention. In the present embodiment, the touch sensing apparatus 700 comprises a plurality of channels Ch1 to Chn 750. Each channel 750 may comprises the plural signal processing units 230-290 of the touch sensing apparatus 200 shown in FIG. 10, the plural signal processing units 430-490 of the touch sensing apparatus 400 shown in FIG. 14, the plural signal processing units 530-590 of the touch sensing apparatus 500 shown in FIG. 15, or the plural signal processing units 630-690 of the touch sensing apparatus 600 shown in FIG. 16. Each channel 750 provides a plurality of different PN codes and/or periodic waves of different frequencies so as to generate a plurality of driving signals. The driving signals are used to drive multiple rows of a sensing array 710. Multiple columns are detected at the same time by the respective channels 750. The operations in each channel are similar to those described in the above embodiments. By doing so, touching information of more points can be obtained at a time. It is noted that several channels 750 may share the PN code generators and/or periodic wave generators of the respective signal processing units.

Figure 18:
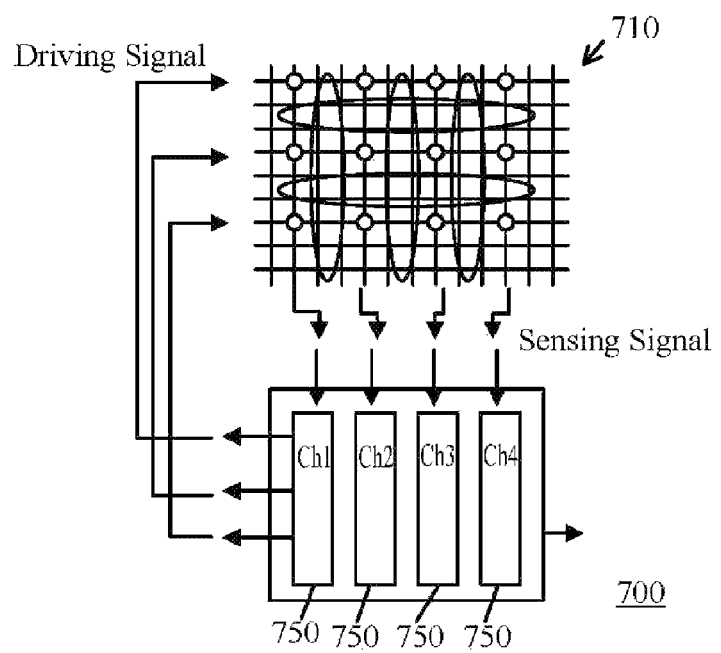
FIG. 18 schematically shows an operation arrangement for the touch sensing apparatus of FIG. 17.

To reduce coupling noises, it is preferred that the multipoint detected at a time are separated from each other. That is, it is preferred that the adjacent nodes of the sensing array are not driven and measured at the same time. FIG. 18 schematically shows a preferable operation arrangement for the touch sensing apparatus 700 of FIG. 17. As shown, the driven rows of the sensing array 710 are separated by a row. In addition, the measured columns of the sensing array 710 are also separated by a column. Other suitable arrangements are also possible.

In each of the above embodiments, the components are described as above so as to be easily understood. However, in practice, the modulation signal generation portions such as the PN code generator(s) and the periodic wave generator(s) are considered to belong to the driving circuit of the touch sensing apparatus, while the demodulators are considered to belong to the sensing circuit thereof, similar to the first embodiment. That is, the driving circuit of the touch sensing apparatus of the present invention provides one or more driving signals, which are modulated with PN code(s) and/or periodic wave(s). The sensing circuit of the touch sensing apparatus extracts touching information of one or more nodes from a sensing signal by using the same PN code(s) and/or periodic wave(s), respectively.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A touching sensing apparatus comprising:
   a sensing array having multiple rows and multiple columns intersecting with each other to define multiple nodes;
   a plurality of driving circuits, each for providing a driving signal, which is modulated by a modulation signal, to drive a row of the sensing array; and
   a plurality of sensing circuits, each receiving a sensing signal measured from a column of the sensing array and extracting touching information of a node, which is an intersection of the driven row and the measured column, by using the modulation signal used by a corresponding one of the driving circuits,
   wherein there is provided only one row per driving circuit and each row is driven with a different modulated driving signal provided by the driving circuit associated with that row, the modulated driving signal is modulated with a specific pseudorandom (PN) code, the PN code has a characteristic of random spread spectrum, and the sensing signal of the measured column is provided to the respective sensing circuits.

2. The touch sensing apparatus of claim 1, wherein each driving circuit comprises a pseudorandom noise (PN) code generator for providing the PN code as the modulation signal, the respective PN code generators provide different PN codes as the modulation signals.

3. The touch sensing apparatus of claim 1, wherein each driving circuit comprises a periodic wave generator for providing the periodic wave as the modulation signal, the respective periodic wave generators provide periodic waves of different frequencies as the modulation signals.

4. The touch sensing apparatus of claim 3, wherein the different frequencies are separated from each other by an interval of at least 10 kHz.

5. The touch sensing apparatus of claim 3, wherein the periodic waves are square waves.

6. The touch sensing apparatus of claim 3, wherein the periodic waves are sine waves.

7. The touch sensing apparatus of claim 1, wherein some of the driving circuits comprise PN code generators for respectively providing different PN codes, and the other driving circuits comprises periodic wave generators for respectively providing periodic waves of different frequencies.

8. The touch sensing apparatus of claim 7, wherein the PN code generators and the periodic wave generators are arranged alternately.

9. The touch sensing apparatus of claim 7, wherein the periodic waves are square waves of different frequencies.

10. The touch sensing apparatus of claim 7, wherein the periodic waves are sine waves of different frequencies.

11. A method for sensing a plurality of touch events to at least one touch sensing apparatus having a sensing array, the method comprising:
provide a plurality of driving circuits, each driving circuit comprises a pseudorandom noise (PN) code generator and a demodulator;
providing a plurality of driving signals respectively modulated by different modulation signals from each PN code generator to drive a plurality of traces of the sensing array; the modulation signal including at least one PN code, and the PN code having a characteristic of random spread spectrum; and respectively using the same modulation signals to extract touching information of the driven traces via each demodulator, wherein
each trace is driven with a different modulated driving signal provided by the driving circuit associated with that trace.

12. The method of claim 11, wherein the modulation signals comprise different random spread spectrum signals.

13. The method of claim 11, wherein the modulation signals comprise periodic waves of different frequencies.

14. The method of claim 11, wherein the modulation signals comprise different random spread spectrum signals and periodic waves of different frequencies.

* * * * *